Figure 6:
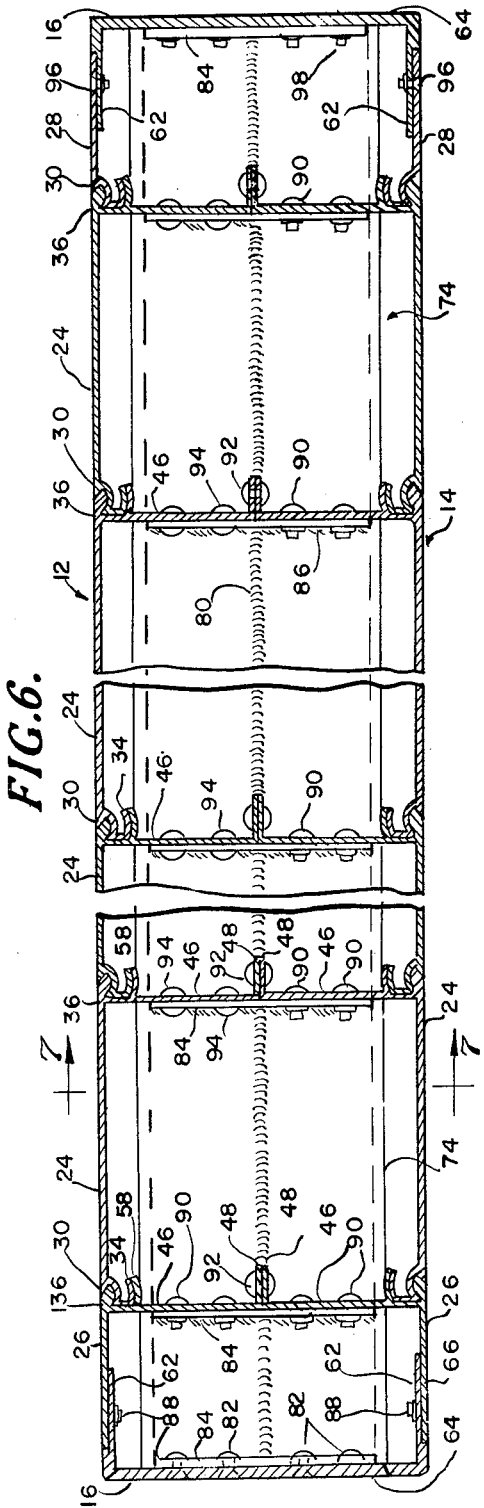

April 10, 1962   R. G. EARLY ETAL   3,029,052
FORK LIFTABLE PALLET
Filed April 12, 1960   2 Sheets-Sheet 1
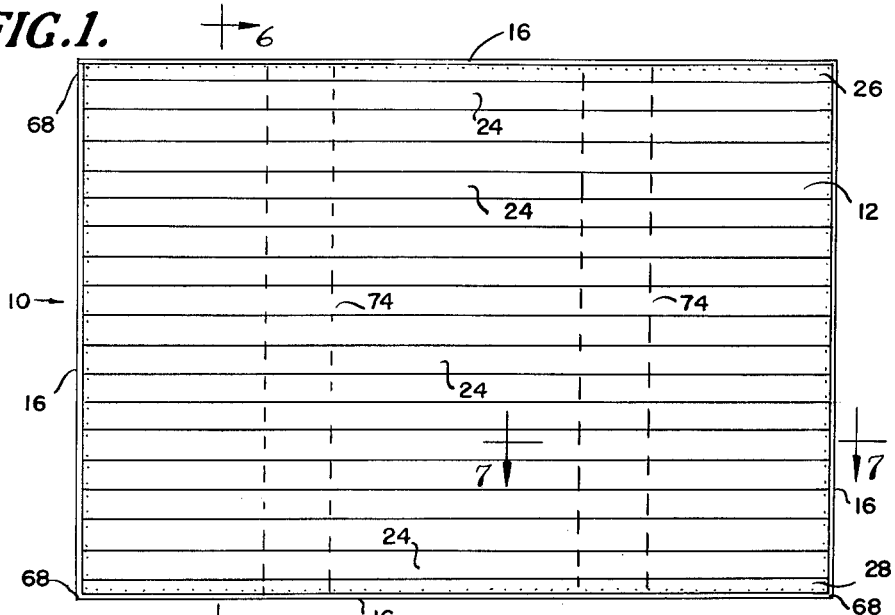
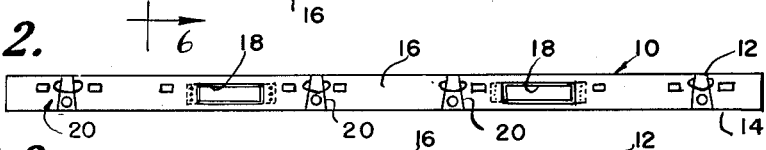
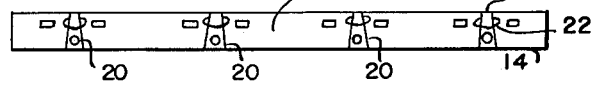
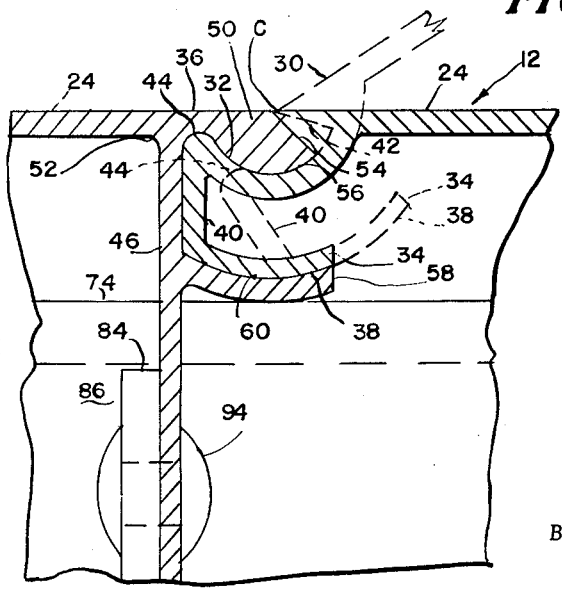
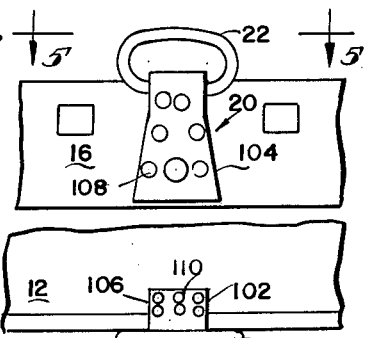
INVENTORS
REX G. EARLY
ERNST J. DeRIDDER
BY *Glenn & Jackson*
ATTORNEYS April 10, 1962 R. G. EARLY ETAL 3,029,052
FORK LIFTABLE PALLET
Filed April 12, 1960 2 Sheets-Sheet 2

INVENTORS
REX G. EARLY
ERNST J. DeRIDDER

BY Glenn & Jackson
ATTORNEYS

United States Patent Office 3,029,052
Patented Apr. 10, 1962

3,029,052
FORK LIFTABLE PALLET
Rex G. Early and Ernst J. De Ridder, Henrico County, Va., assignors to Reynolds Metals Company, Richmond, Va., a corporation of Delaware
Filed Apr. 12, 1960, Ser. No. 21,657
10 Claims. (Cl. 248—120)

The present invention relates to improved load carrying or supporting pallets and, more particularly, to an improved pallet construction which is capable of supporting heavy loads and shocks and is capable of use with a fork-lift type of vehicle.

In prior pallet constructions of the type intended for use with fork-lift trucks, the load supporting surface has heretofore been usually provided with downwardly extending legs or runners so that the fork-lift vehicle could position its forks beneath the load supporting surface when the pallet is resting on the ground and lift the same off of the ground. Such prior pallet constructions have certain disadvantages in modern freight handling systems where the pallet must be transferred by sliding or moving along a conveyor. Where the pallet is provided with legs or with runners, difficulty has been encountered in moving this type of pallet across a roller-type conveyor surface and thus the use of the pallet is restricted to cargo handling systems of the type utilizing fork-lift vehicles or cranes or hoist for lifting and transferring the pallet from one place to another. For the modern freight handling conveyor systems now found in freight terminals such as railroad stations, airports and truck loading and unloading stations, pallets should be provided with a smooth uninterrupted bottom surface.

An object of the present invention is to provide an improved pallet construction wherein a box-like pallet is fabricated having upper and lower load supporting surfaces or decks which are relatively smooth and uninterrupted.

Ancillary to the preceding object, it is a further object of the present invention to provide a pallet capable of utilizing either of its exterior surfaces for receiving a load.

In recent years, freight has been transferred and shipped more and more by aircraft. Weight is an extremely important consideration in air freight as the air carrier must consider this item in determining the costs of transportation as well as the size of the item. Consequently, pallets heretofore used for supporting cargo during transportation have proved unsatisfactory because of their excessive weight and bulkiness.

A further object of the present invention is to provide a pallet construction which is extremely light in weight and yet has sufficient strength and durability to be used for hauling heavy payloads.

Another object of the present invention is to provide an improved pallet construction wherein cargo can be tightly strapped thereon, thereby eliminating shifting of cargo during transit.

Still another object of the present invention is to provide a fork-lift type of pallet which may also be used with modern day handling systems utilizing roller-type conveyors or other conveyors for moving palletized loads.

A still further object of the present invention is to provide a pallet which will stand abuse and may be reusable for long periods of time.

Still another object of the present invention is to provide a pallet structure made primarily of light weight aluminum sections, the sections being arranged and secured together in such a manner as to provide a pallet which has strength characteristics of steel or heavier constructed units.

Ancillary to the immediately preceding object, it is a further object of the present invention to provide an improved pallet construction wherein the top and bottom deck surfaces are made from a plurality of extruded metallic panel-like sections having complementary interlocking configurations along their side edges enabling quick assembly of a strong and durable structure at a minimum expense.

Another object of the present invention is to provide a pallet construction made from aluminum sections so arranged and interlocked to provide a rigid unitary structure having opposed substantially smooth and uninterrupted load carrying surfaces.

A further object of the present invention is to provide a pallet having improved lift fork receiving means which protect the pallet from damage by the lift forks.

Figure 7:
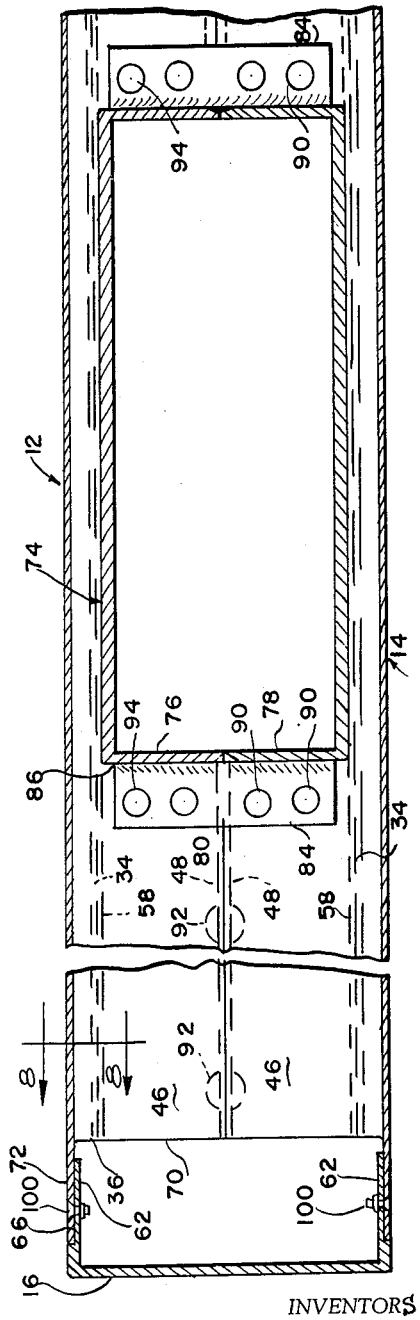

These and other objects and advantages of the present invention will appear more fully in the following specification, claims and drawings in which:

FIGURE 1 is a top plan view of the improved pallet construction of the present invention;
FIGURE 2 is a side elevational view of the pallet of the present invention taken along the length of the same;
FIGURE 3 is a side elevational view of the pallet of the present invention taken along the width of the same;
FIGURE 4 is an enlarged fragmentary view of the load fastening means;
FIGURE 5 is a fragmentary view taken on the line 5—5 of FIGURE 4;
FIGURE 6 is an enlarged sectional view broken away and taken on the line 6—6 of FIGURE 1;
FIGURE 7 is an enlarged fragmentary sectional view taken on the line 7—7 of FIGURES 1 or 6; and
FIGURE 8 is a further enlarged fragmentary view taken on the line 8—8 of FIGURE 7.

Referring now to the drawings wherein like character or reference numerals represent like or similar parts, the improved pallet construction of the present invention is generally designated by the numeral 10. As illustrated in FIGURES 1 to 3 inclusive, the pallet 10 includes a top deck member 12, a bottom deck member 14 (FIGURES 2 and 3) and relatively narrow side walls 16 secured to the top and bottom deck members 12 and 14 respectively. Since the pallet 10 is rectangularly shaped in plan, four side walls 16 are provided to enclose the area between the top deck member 12 and bottom deck member 14 so that the resulting structure is box-like. A more detailed description of the side walls 16 as well as the top and bottom deck members 12 and 14 respectively will follow later in the specification.

It will be noted from inspection of FIGURE 2, the side walls 16, which define the longitudinally extending side walls of the pallet 10 are provided with apertures 18 which are adapted to receive the forks of a fork-lift vehicle. The construction of the pallet 10 provides for improved means to receive the lifting forks, the means being described in more detail later in the specification. Also, it will be evident from inspection of FIGURES 1 to 3 that the surfaces of the upper deck member 12 and the lower deck member 14 are substantially smooth and uninterrupted. By having both surfaces smooth and uninterrupted, either surface can be used for receiving the cargo or for permitting the pallet with its cargo to be conveyed over a roller-type conveyor or the like.

Pallet 10 is provided with a plurality of lading strap fastening means 20 suitably spaced along and secured to each of the four walls 16. Each fastening means 20 includes a ring or link 22 which may be used to receive cargo tie-down ropes or the like for detachably securing cargo to the pallet for transportation of a palletized load. If it is desirable, the links 20 adjacent each of the corners of the pallet may be used to receive a sling structure whereby the pallet and its load may be lifted and moved by suitable cranes or hoist. As will be explained in more detail later in the specification, the tie-down links 22 can be pivoted from a position where they lie substantially flush against the side walls 16 to an operative position for receiving the tie-down ropes as shown in FIGURE 4.

Referring now to FIGURES 6, 7 and 8 of the drawings which illustrate the detailed construction of the improved pallet 10 of the present invention, the top deck member 12 includes a plurality of elongated rectangular panel-like extruded aluminum sections 24, each having identical sectional profile configurations. The outer longitudinal edge portions of the top deck member 12 includes an elongated rectangular panel-like extruded section 26 having one edge profile configuration complementary to one of the edge profile configurations of the sections 24, and a second elongated rectangular panel-like extruded section 28 having one edge profile configuration complementary to an opposite edge profile configuration of one of the sections 24. Since the upper and lower deck members 12 and 14 respectively are made up of substantially similar extruded sections 24, 26 and 28, the detailed description of the sections of the top deck member 12 will suffice for the description of the bottom deck member 14. However, the description will include the assembly of the top and bottom deck members 12 and 14 together to form an improved novel, substantially integral unitary structure.

Rectangularly shaped panel-like sections 24, which are identical in sectional profile, are provided along one longitudinal free edge 30 with an inwardly offset portion defining an outwardly facing groove or channel having a curved surface 32. Curved surface 32 has a center of curvature substantially on the outer surface of the panel-like section 24 as indicated at C in FIGURE 8. A flange-like projection 34 spaced inwardly from the outwardly facing curved surface 32 and forming an integral part of the longitudinally extending offset edge portion 30, extends reversely back toward the other longitudinal edge portion 36 of the section 24. Projection 34 is provided with an outwardly facing curved surface 38 which is oppositely disposed from the outwardly facing surface 32. Curved surface 38 has the same center of curvature C as the curved surface 32. Projection 34 merges smoothly into the rectangularly shaped side panel of section 24 as shown at 40 but the groove or channel defined by the curved surface 32 terminates in a flat surface 42 extending inwardly from the outer panel-like surface of the section at an acute angle thereto. A rounded ridge portion 44 between the curved surface 32 and the outermost portion of the rectangularly projecting extension 40 provides a smooth surface for the interlocking profile configuration when it is attached to a complementary interlocking profile configuration on an adjacent section 24 or the adjacent section 26 whichever the case may be.

A rib 46 formed integral with the section 24 extends from the inner surface of the same along the opposite longitudinal edge portion 36. The rib 46 is provided along its free end with an integral flange 48 extending parallel to but outwardly of the panel-like surface of section 24. An overhanging lip 50 extends outwardly from a point of junction 52 of the rib 46 with the side panel of the section 24. Lip 50 has a beveled flat edge 54 extending at an obtuse angle to the outer panel surface of section 24, the angle being complementary to the acute angle of the surface 42 on the opposite edge configuration. An inwardly facing curved surface 56 is provided on the lip 50 and merges smoothly into the rib 46, the curved surface 56 being complementary to the outwardly facing curved surface 32 on the opposite longitudinal profile edge configuration. It will be noted that the radius of curvature of the curved surface 56 is substantially equal to the radius of curvature of the curved surface 32 and the center of curvature is substantially superposed on the center of curvature C when adjacent sections are in interlocking engagement.

A flange-shaped extension 58 integral with rib 46 and extending therefrom on the same side of the rib as the overhanging lip 50, is provided with an inwardly facing curved surface 60 complementary in curvature to the curved surface 38 of projection 34. Both curved surfaces 56 and 60 of the edge portion 36 have the same center of curvature which is located substantially on the outer panel surface of the section 24.

When a pair of sections 24 are to be interlocked with one another so that their outer panel-like surfaces provide a substantially smooth uninterrupted surface, the curved surfaces 56 and 60 are first partially engaged by the curved surfaces 32 and 38 respectively as shown in the broken lines of FIGURE 8. From an inspection of FIGURE 8, it will be observed that when the curved surfaces of one section 24 are partially engaged with the complementary curved surfaces of the adjacent section 24, the two sections are tilted or at an angle to each other. By rotating one section 24 relative to the other section 24 about the partially engaging curved surfaces 32—56 and 38—60 until the surfaces are completely engaged as shown in the solid lines of FIGURE 8, will cause the panel-like sections 24 to interlock with their outer panel surfaces having a common plane which is smooth and uninterrupted.

The end panel-like configuration 26 best shown in sectional profile in FIGURE 6 is provided with an identical edge profile configuration to the edge portion 36 of a section 24. In other words, one longitudinal edge of the section 26 is provided with a pair of spaced curved surfaces 56 and 60 for engaging the respectively complementary curved surfaces 32 and 38 of the section 24 which is attached thereto. The section 26 is provided with the rib 46 having a flanged-free end 48 just as each of the sections 24. The opposite edge of the section 26 is substantially smooth and uninterrupted along its entire length.

The panel-like extruded section 28 is provided with an edge profile configuration along one longitudinal edge which is identical with the edge configuration 30 of the sections 24. In other words, the section 28 is provided with an edge configuration having a pair of curved surfaces 32 and 38 which are complementary to the curved surfaces 56 and 60 respectively on the edge configuration 36 of the section 24 which is attached thereto.

Each of the side walls 16 is channel-shaped in sectional profile and is provided with legs 62 separated by a web 64. The only difference between the side walls 16 for the lengths and widths of the pallets is the actual overall length of the element. Each of the legs 62 is provided on its outer surface with a rabbet or groove 66 and thus when the side walls 16 are attached to the upper and lower peripheral edges of the top and bottom deck members 12 and 14 respectively, a flush fit is obtained. The ends of each of the channel-shaped side walls 16 are cut on a bias and when the respective side walls are assembled, a mitered corner 68 (FIGURE 1) is provided.

When the extruded sections 24, 26 and 28 are fabricated, the interlocking edge profile configurations do not extend for the entire longitudinal length of the sections. As shown in FIGURE 7, the ribs 46 as well as the interlocking edge configurations 30 and 36 terminate at 70 so that there is an overhanging portion 72 on the ends of each of the sections which may be received in the channel or rabbet 66 of the legs 62 of side walls 16.

As mentioned at the outset of the specification, means are provided for receiving the forks of a fork-lift vehicle. Referring now to FIGURES 1, 6 and 7, it will be noted that a pair of spaced tubular members 74 extend transversely through the upper and lower deck members 12 and 14 respectively. In more detail, the tubular members 74 open to the apertures 18 provided in oppositely disposed longitudinally extending side walls 16 of the pallet 10. The tubular member 74 comprises a pair of extruded aluminum channel-shaped elements 76 and 78 welded together along abutting longitudinal edges as indicated at 80, the tubular members 74 extending through suitable mating and aligned cutout portions provided in each of the ribs and flanges 46 and 48. The width of the tubular member 74 is such that it will abut against the extensions 58 of the sections making up the top and bottom deck members 12 and 14, when secured with the pallet. Further, the tubular member 74 is secured to each of the ribs 46 by rivets extending through the ribs and plates 84 welded as indicated at 86 to the side walls of the tubular member 74. By having the tubular member abut the inner surfaces of the extension 58 and permanently secured to each of the ribs 46 as well as the side walls 16, a very strong and durable structure results and the forces exerted by the forks on the pallet are evenly distributed throughout the structural members of the pallet.

The improved pallet construction 10 heretofore described is assembled in the following manner and as assembled provides an extremely rigid, strong, durable unitary structure which is light in weight.

Referring to FIGURE 6 of the drawings, the side wall 16 shown in the left hand portion thereof is riveted to the plates 84 as indicated at 82, the plates 84 having been previously welded to the ends of the tubular member 74. The tubular members 74 are aligned with the apertures 18 in the side wall 16 when they are secured thereto. After the left hand side wall 16 is riveted to the tubular member 74, each of the opposed sections 26 of the respective top and bottom deck members 12 and 14 are positioned in the rabbet 66 of the side walls 16 and when so positioned, the flanges 48 of the sections abut one another. Also, the ribs 46 of the flanges will abut and be contiguous with the plates 84 previously welded to the side walls of the tubular member 74. Blind rivets 88 are passed through the panels of the sections 26 and secured to the legs 62 of the side wall 16. Also, blind rivets 90 are used to fasten the ribs 46 to the plate 84. Abutting flanges 48 are rigidly secured together by conventional rivets 92. With this much of the assembly completed, the upper section 24 is then positioned so that its edge portion 30 partially engages the edge portion 36 of the upper section 26. The section 24 is then rotated or pivoted about the partially engaged cooperating curved surfaces until it is in the same plane as the panel of the section 26. When it is in this position, its rib 46 will abut the plate members 84 and it is then permanently secured thereto by conventional buck-type rivets 94. The bottom section 24 may then be partially engaged along one of its edges with the complementary edge of the bottom section 26 and pivoted into a position where its rib 46 abuts the plates 84 and its flange 48 abuts the flange 48 of the upper section 24. When the lower section 24 is in this position, it is more desirable to use blind rivets 90 to secure the rib 46 to the plate 84. The two abutting flanges 48 are riveted together by conventional rivets 92. The above procedure with respect to assembling the various sections 24 of both the top and bottom members 12 and 14 respectively to each other is successively repeated until the desired number of sections 24 have been assembled. The sections 28 are next assembled into position and the side wall 16 at the right hand side of FIGURE 6 is riveted to the respective sections 28 by blind rivets 96. Also, the side wall 16 is riveted through its web 64 by blind rivets 98 to the plates 84 welded to the tubular member 74. The pallet structure is completed by then riveting the two transversely extending side walls 16 to the upper and lower assembled deck members 12 and 14 respectively by blind rivets 100 as shown in FIGURE 7.

After the four side walls 16 have been secured to the top and bottom deck members 12 and 14 respectively, the fastening means 20 are secured to the side walls and top deck member. In more detail, the fastening means 20 includes an L-shaped strap member 102 having a leg 104 with a portion for receiving the ring 22 and a leg 106 for securing the same to the top deck member 12. Leg 104 is riveted to the side wall 16 by blind rivets 108 whereas leg 106 is riveted to the top surface of the top deck member 12 by rivets 110. The ring 22 which is held between the side wall 16 and the leg 104 can pivot from an operative position shown in FIGURE 4 downwardly along the side wall where it will be completely out of the way when the pallets are stacked for storage.

It thus will be seen that the objects and advantages of this invention have been fully and effectively accomplished. However, it will be realized that the foregoing specific embodiments which have been shown and described for the purpose of illustrating the principles of the invention, and are subject to extensive change without departing from such principles. Therefore, the terminology used in the specification is for the purpose of description and not limitation, the scope of the invention being defined by the claims.

We claim:

1. A substantially rectangular shaped load carrying pallet comprising: spaced apart top and bottom load supporting deck members, and side walls fixedly secured to said top and bottom deck members about their peripheral edges, each of said top and bottom members having a substantially smooth uninterrupted outwardly facing surface, said top member comprising a plurality of panel-like extruded sections having complementary interlocking configurations along the side edges of the same for snug interlocking engagement, said bottom member comprising a plurality of panel-like extruded sections having complementary interlocking configurations along the side edges of the same for snug interlocking engagement, and means supporting said top and bottom members in a spaced part relationship to each other and securing said sections together, said last-mentioned means including ribs integral with each of said panel-like extruded sections of said respective top and bottom members, the ribs of the sections of the top member projecting inwardly from the outer surface of the same and the ribs of the sections of the bottom member projecting inwardly from the outer surface of the same and oppositely disposed to the first-mentioned ribs, each of said ribs having a flange-like free end, the flange-like free ends of oppositely disposed ribs abutting each other, and means for individually securing abutting flange-like free ends together.

2. The structure defined in claim 1 including at least one tubular member positioned between said top and bottom members and extending transversely through said ribs and opening to an aperture provided in one of the side walls for receiving lift forks, said tubular member being rigidly secured to said ribs.

3. The structure defined in claim 2 wherein said tubular member comprises a pair of extruded channel-shaped members oppositely disposed to each other and secured along abutting side edges of the same.

4. The structure defined in claim 2 including plate elements rigidly secured to sides of said tubular member, said plate elements abutting and secured to the ribs of the panel-like extruded sections of said top and bottom members.

5. The structure defined in claim 1 wherein said means for securing the flange-like free ends together includes rivets.

6. In a substantially rectangular shaped load carrying pallet having smooth uninterrupted outwardly facing spaced apart deck surfaces: a pair of panel-like generally rectangular parallel extruded metal sections having integral ribs along a pair of aligned side edges, said ribs having flange-like free ends in abutting relationship with each other, means for fastening said abutting flange-like free ends together; a second pair of parallel extruded metal sections having integral ribs along a pair of aligned side edges, said ribs having flange-like free ends in abutting relationship to each other; means independent of said first-mentioned fastening means for fastening said abutting flange-like free ends of said second pair of sections together, pivotally interlocked complementary configurations integral with the edges of each of said first pair of sections and integral with the edges of each of said second pair of sections, the arrangement being such that for assembly the configuration of one section of said first pair of sections and the complementary configuration of one section of said second pair of sections can be partially engaged with each other and the sections pivoted about said engagement into full engagement of the configurations with the sections in a common plane to portions of one of said spaced apart deck surfaces, the other sections of each of said pairs being likewise secured to each other to form a portion of the other of said deck surfaces and each of said means for fastening said flange-like ends of said ribs together being adapted to fasten said abutting flange-like free ends together after interlocking of each successive pair of sections.

7. A structure defined in claim 6 including a plurality of channel-shaped metal extrusions, one of said channel-shaped extrusions being provided for each pair of aligned peripheral sides edges of said deck surfaces, the legs of said channel-shaped sections being respectively secured to peripheral edge portions of said deck surfaces.

8. The structure defined in claim 7 wherein at least one of said channel-shaped members is provided with a pair of spaced apart apertures, a pair of tubular members secured to and carried between said deck surfaces, said tubular members being aligned with said apertures and providing a passageway to accommodate lift forks.

9. The structure defined in claim 8 wherein said tubular members extend transversely of said ribs through aligned apertures provided therein, said tubular members being rigidly and independently secured to each of said ribs.

10. The structure defined in claim 8 wherein each of said tubular members comprises a pair of channel-shaped elements oppositely disposed to each other and welded together along abutting longitudinal free edges.

References Cited in the file of this patent

UNITED STATES PATENTS

| | | |
|---|---|---|
| 2,177,036 | Greulich | Oct. 24, 1939 |
| 2,465,134 | Toffolon | Mar. 22, 1949 |
| 2,827,302 | Skyrud | Mar. 18, 1958 |
| 2,858,774 | Batten | Nov. 4, 1958 |
| 2,926,928 | Bennett | Mar. 1, 1960 |

FOREIGN PATENTS

| | | |
|---|---|---|
| 799,166 | Great Britain | Aug. 6, 1958 |